(12) United States Patent
Lowe

(10) Patent No.: US 7,188,229 B2
(45) Date of Patent: Mar. 6, 2007

(54) METHOD AND APPARATUS FOR MEMORY MANAGEMENT IN A MULTI-PROCESSOR COMPUTER SYSTEM

(75) Inventor: Eric E. Lowe, Pflugerville, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 376 days.

(21) Appl. No.: 10/769,586

(22) Filed: Jan. 30, 2004

(65) Prior Publication Data

US 2005/0172099 A1    Aug. 4, 2005

(51) Int. Cl.
*G06F 12/00* (2006.01)
(52) U.S. Cl. ............... 711/207; 711/118; 711/202; 711/203; 711/206
(58) Field of Classification Search ............ None
See application file for complete search history.

(56) References Cited

U.S. PATENT DOCUMENTS

| | | | | |
|---|---|---|---|---|
| 5,899,994 A | * | 5/1999 | Mohamed et al. | 707/100 |
| 5,906,001 A | * | 5/1999 | Wu et al. | 711/154 |
| 5,956,756 A | * | 9/1999 | Khalidi et al. | 711/207 |
| 6,427,162 B1 | * | 7/2002 | Mohamed | 718/108 |

OTHER PUBLICATIONS

Microsoft Computer Dictionary, 2002, Microsoft Press, 5th Edition, p. 387.*

Sartaj Sahni, Data Structures, Algorithms, and Applications in Java, 2000, McGraw-Hill Higher Education, pp. 15-16.*
David A. Patterson and John L. Hennessy, Computer Architecture a Quantitative Approach, 1996, Morgan Kaufmann Publishers, pp. 638-639.*
Andrew S. Tanenbaum and Albert S. Woodhull, Operating Systems Design and Implementation, 1997, Prentice-Hall, 2nd Edition, pp. 324-325.*

* cited by examiner

*Primary Examiner*—Reginald Bragdon
*Assistant Examiner*—Shawn Gu
(74) *Attorney, Agent, or Firm*—Darby & Darby PC; John W. Branch

(57) ABSTRACT

Improved techniques and systems for accommodating TLB shootdown events in multi-processor computer systems are disclosed. A memory management unit (MMU) having a TLB miss handler and miss exception handler is provided. The MMU receives instructions relative to a virtual address. A TLB is searched for the virtual address, if the virtual address is not found in the TLB, secondary memory assets are searched for a TTE that corresponds to the virtual address and its associated context identifier. The context identifier is tested to determine if the TTE is available. Where the TTE is available, the TLB and secondary memory assets are updated as necessary and the method initiates memory access instructions. Where the TTE is unavailable, the method either resolves the unavailability or waits until the unavailability is resolved and then initiates memory access instructions, thereby enabling the desired virtual address information to be accessed.

21 Claims, 11 Drawing Sheets

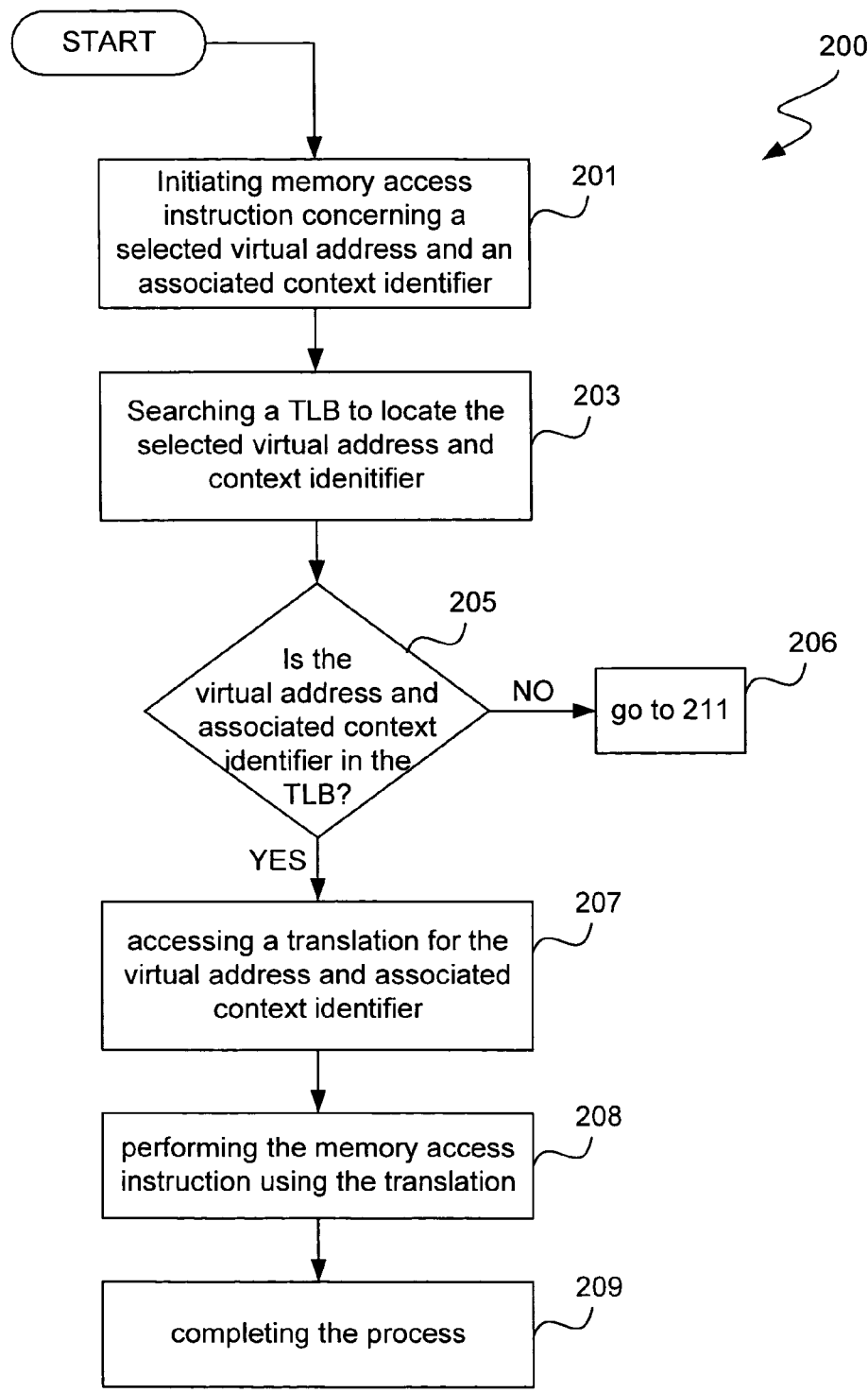
Fig. 2.1

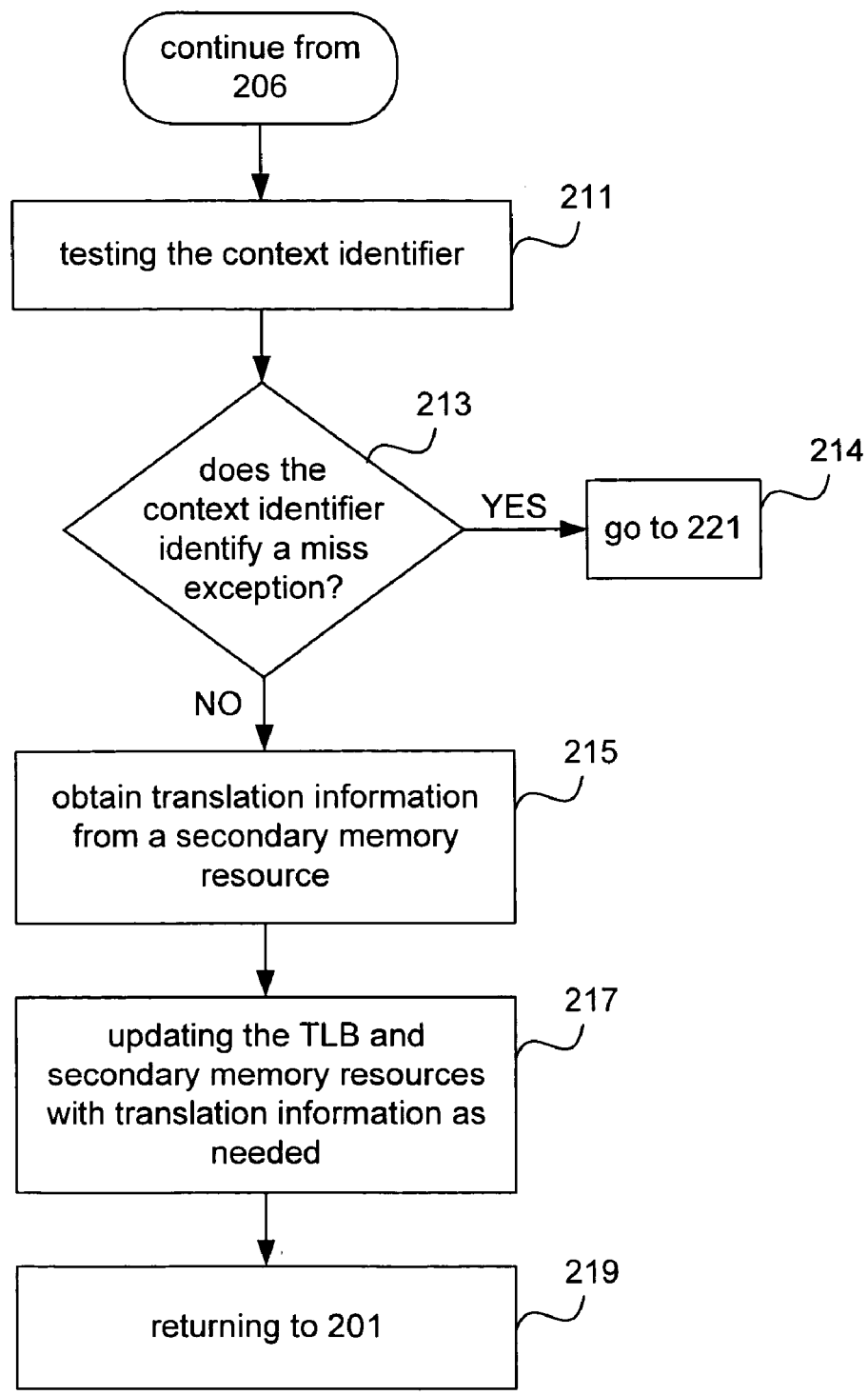
Fig. 2.2

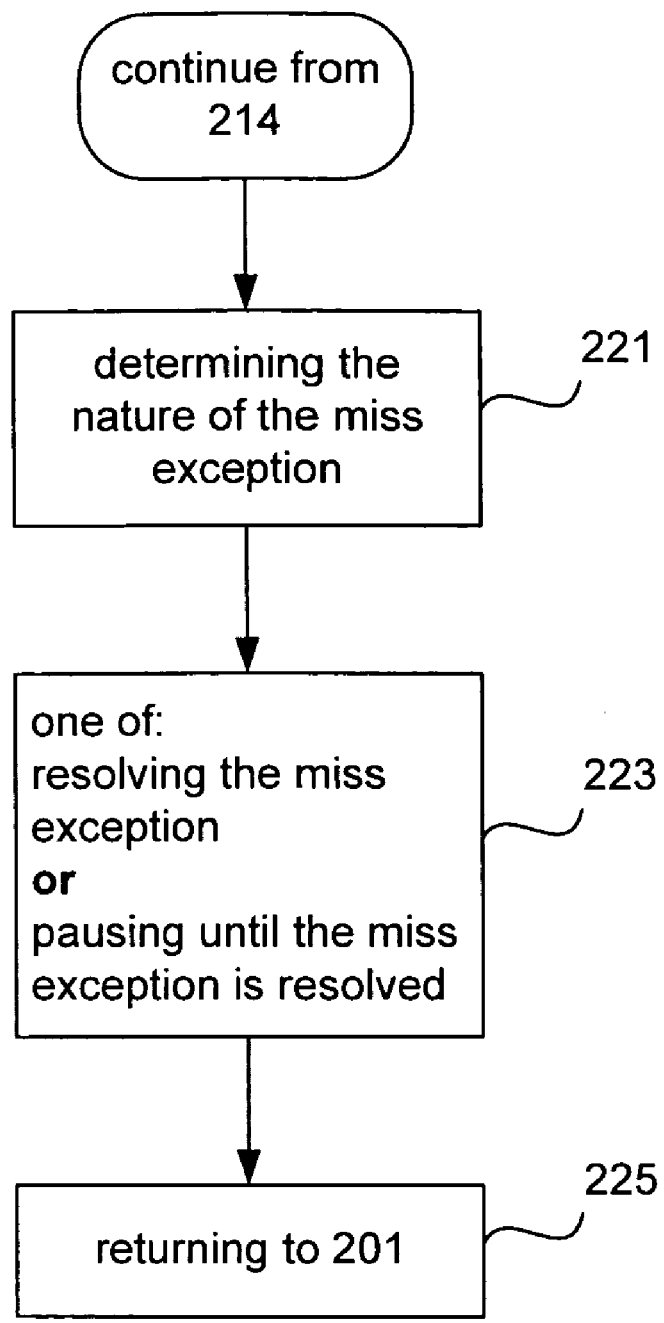
Fig. 2.3

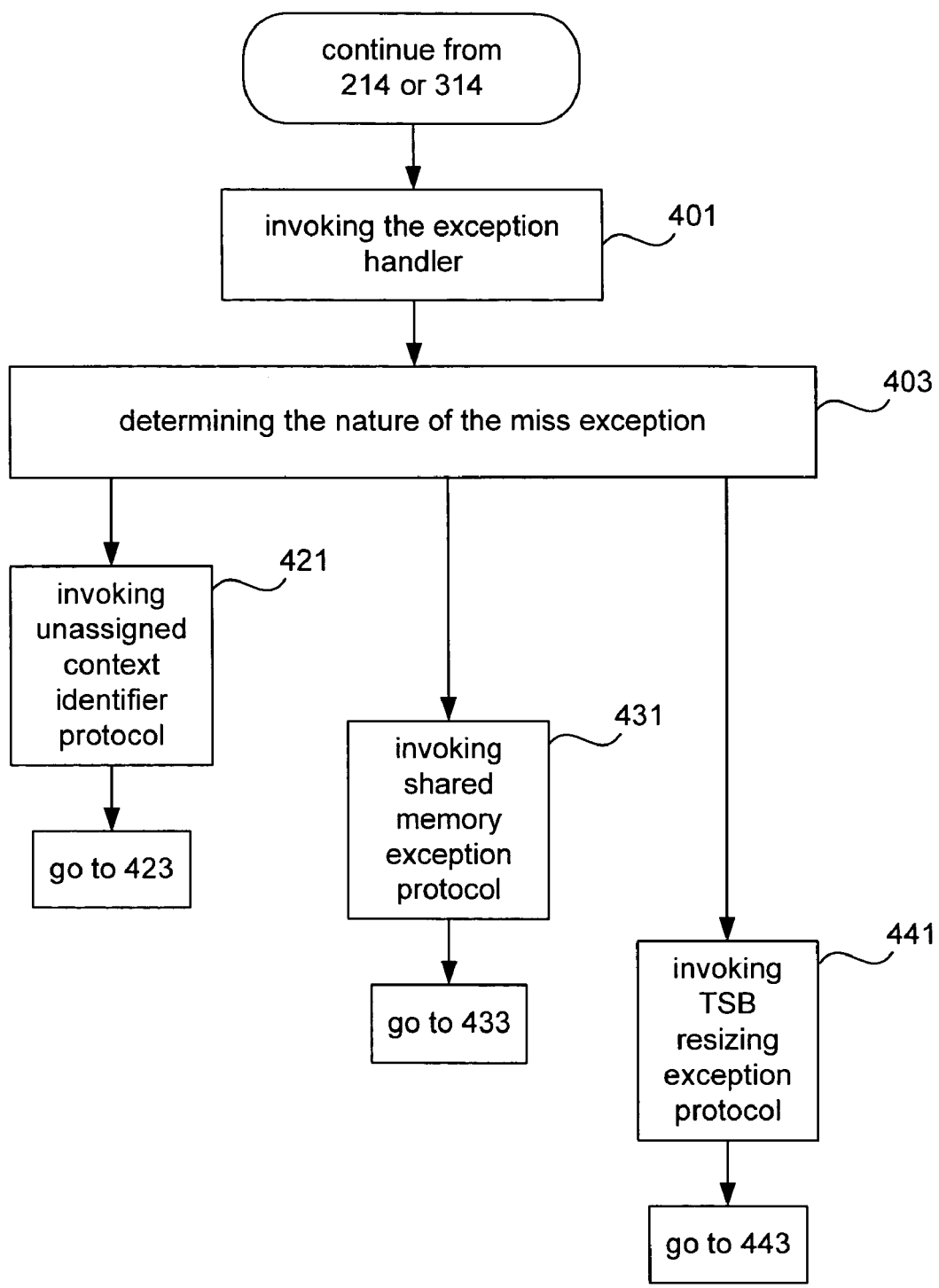
Fig. 4.1

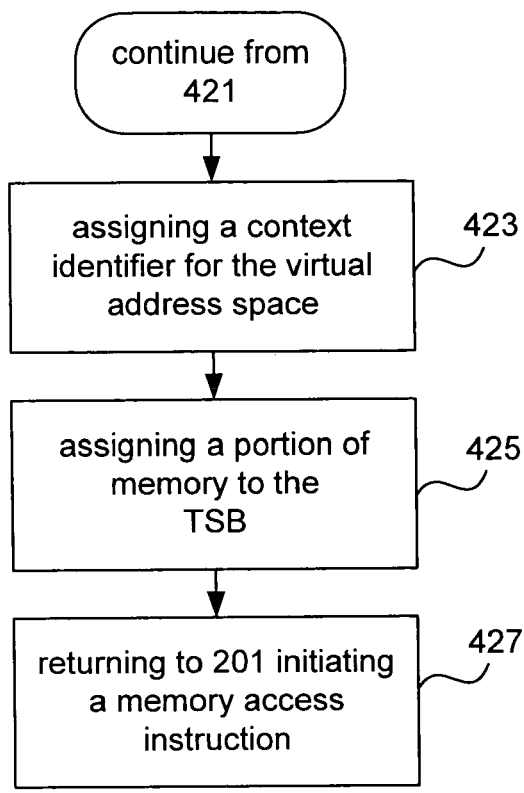
FIG. 4.2
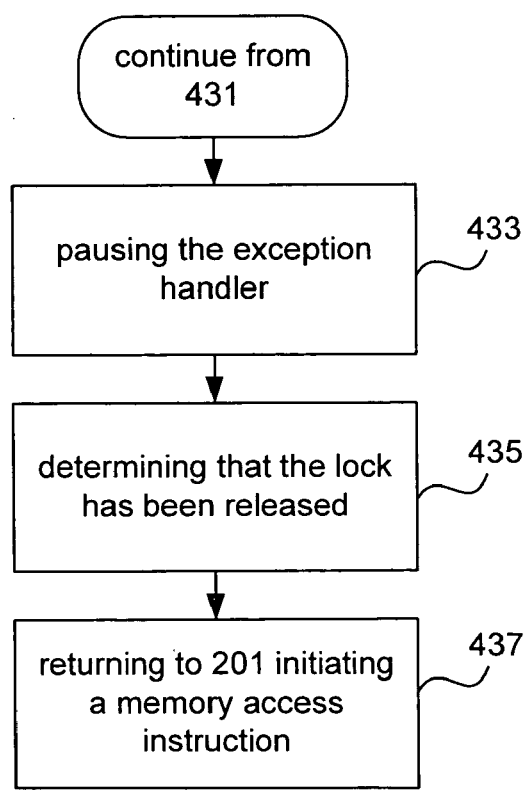
FIG. 4.3

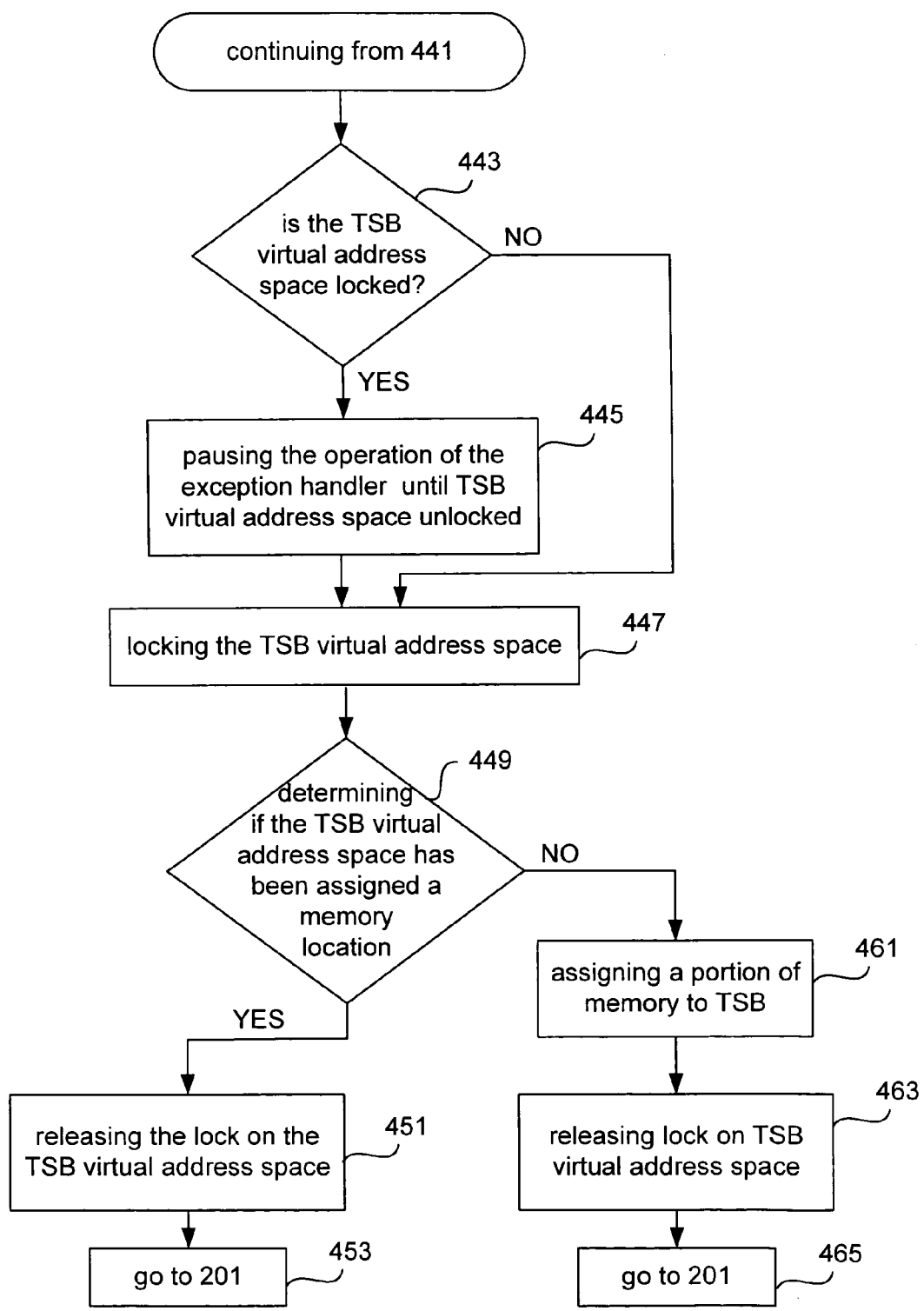
Fig. 4.4

METHOD AND APPARATUS FOR MEMORY MANAGEMENT IN A MULTI-PROCESSOR COMPUTER SYSTEM

RELATED APPLICATION

The invention described herein relates to and claims priority from the Provisional Patent Application No. 60/537,431, entitled "Method and Apparatus for Memory Management in a Multi-Processor Computer System", invented by Eric F. Lowe, filed on Jan. 17, 2004. The aforementioned patent document is hereby incorporated by reference in its entirety for all purposes.

BACKGROUND OF THE INVENTION

The present invention relates to multiprocessor computing systems and, more particularly, to memory management unit (MMU) trap synchronization in multiprocessor computing systems. Multiprocessor computing systems are coming into increasingly common usage due to the many advantages inherent in such systems. In such systems, a single operating system controls the operation of all the microprocessors (CPU's) of the system. Common multiprocessor systems include scalable shared memory (SSM) system symmetric multiprocessor (SMP) systems. System symmetric multiprocessing can make use of multiprocessor computing architectures configured so that all CPU's can access all random access memory locations. Many architecture can implement such systems. Example include without limitation X86 systems as well as SSM system symmetric multiprocessor system architectures designed by Motorola, IBM, and Microsoft (e.g., NT systems). Linux based systems can also take advantage of the principles of the invention. Another architecture suitable for implementing the principles of the invention is the so-called SPARC architecture. SPARC is short for Scalable Processor Architecture, a RISC (reduced instruction set computer) technology developed by Sun Microsystems. The term SPARC® itself is a trademark of SPARC International, an independent organization that licenses the term to Sun for its use. The details of the SPARC specification are well known to persons having ordinary skill in the art and can be found in many standard references. One example of such a reference is entitled "The SPARC Architecture Manual, Version 9", by SPARC International Edited by David Weaver and Tom Germond, which is hereby incorporated by reference.

Scalable shared-memory multiprocessors distribute memory among the many processors of a system and use scalable interconnection networks to provide high bandwidth and low latency communication. In addition, memory accesses are cached, buffered, and pipelined to bridge the gap between the slow shared memory and the fast processors. Unless carefully controlled, such architectural optimizations can cause memory accesses to be excessively concentrated in the slow shared memory rather than taking advantage of the high speed memory contained in the processors.

As is known to persons having ordinary skill, memory management units (MMU's) maintain listings that include mappings from virtual addresses to associated physical addresses (which exist in RAM). The advantage of such mappings is that the more commonly used physical addresses can be stored in a microprocessor cache for high-speed access. On the downside is the fact that the cache memory used to store these mappings is very small. Such mappings include a physical address and virtual address (also referred to as a translation table entry or TTE) a listing of attributes (such as memory access protection attributes), and a context identifier (which SPARC refers to as a MMU context). Such information is commonly stored in a translation lookaside buffer (TLB) (also known as TB(2), translation buffer, ATC, or address translation cache). The TLB is a small piece of associative memory within a processor which caches part of the translation from virtual addresses to physical addresses. Thus, whenever physical address information is required, the TLB is consulted. One significant advantage of the cache memory is that it performs operation extremely quickly. Thus, it is desirable to take advantage of such cache memory as much as possible.

However, whenever a required translation for a particular virtual address is not present in the TLB the required information must be acquired from another memory asset, which is commonly much slower. This process is referred to as a "TLB miss trap" or alternatively as a type of "MMU trap". In such cases ("miss traps") the address translation must be resolved using other mechanisms. For example, these translations from virtual to physical addresses (as well as other associated information) are also stored in secondary memory resources (also referred to herein as secondary memory assets. Commonly, the secondary memory assets include translation storage buffers (TSB's) and page tables (which stores the entire virtual address space description of each process). These secondary memory assets are commonly located in random access memory (RAM) where they are less easily accessed. Accessing virtual addresses from such secondary resources is a much slower process than TSB access and commonly slows down the system operation. This is especially problematic when remappings of the virtual address space require frequent changes to the TLB.

An additional difficulty encountered when virtual addresses or virtual address spaces are being remapped is that other processes or threads seeking access to the affected virtual addresses cannot access the information without causing inconsistent or fatal results. Therefore, in a multi-processor computer system, maintaining a consistent view of a virtual address space in a multi-threaded process is critical. To obtain this consistent view requires synchronization by the operating system kernel across all of the processors in the system whenever a process virtual address space changes. Thus, when virtual addresses are changed they must be changed for all processes and all processors across the entire system (this process is referred to as synchronization). Such an operation requires that the old translation table entry for a given virtual address be removed (called "demapping" or "unmapping") and a new translation table entry (having a different physical address) be entered. This is referred to a "TLB shootdown". Additionally, all TLB shootdown events must be synchronized across the entire virtual address space for all CPU's in the system. Such synchronization prevents inconsistent mappings so that no single virtual address maps to more than one different physical address. Thus, the TLB's of all CPU's for any given virtual address all map to the same translation table entry.

Further, a difficulty arises when virtual address is being unmapped and another process (possibly running on another processor) seeks to access the same shared memory resource (e.g., a translation table entry (TTE) shared by another process or thread). Such activity can lead to an inconsistent view of the virtual address space. In such a situation the multiple threads will get inconsistent views of the process virtual address space while the virtual address space is changing.

One conventional solution to this problem is using "crosscalls" to halt system operation during TLB shootdown events. Each time a memory unmapping event (e.g. a TLB shootdown) occurs, the unmapping process issues a "crosscall" to all CPU's in the system instructing the CPU's to halt operation while the TLB shootdown operation is performed. The CPU's resume operation when the TLB shootdown operation is complete. This prevents any CPU from accessing a virtual address undergoing a change.

Another conventional approach employed in some architectures is to have all CPU's that are running threads unmap all TLB entries at a given virtual address and place dispatcher locks on the thread while the TLB shootdown occurs.

Each of these conventional approaches has serious drawbacks. For example, in the first approach all CPU's in the system are required to cease operation during the TLB shootdown operation. Moreover, in SPARC compliant systems (e.g., Solaris® systems), the TSB's are more frequently resized to accommodate increases in content and address information. Such resize operations take whole portions of the virtual address space offline for periods of time during a resize operation and must be synchronized. The conventional synchronization approaches require all CPU's in the system to shut down during resize operations. Additionally, as more and more CPU's are added to the system and more and more processes run on the system these resize operations become much more frequent (as do TLB shootdown events). Since each resize operation requires remapping of many virtual address mappings, synchronization requires more and more CPU's to be taken offline for longer and longer periods of time. In fact, as the systems become larger (incorporating more CPU's, more processes, more threads, and consequently more demapping and resizing operations) such operations can bring a system to a standstill. Quite simply, all the CPU's are paused while the TLB, TSB, or page tables are being demapped or updated. Consequently, during such operations the CPU's are idle doing no meaningful work during the time in which the virtual address space is being reconfigured. This can impose drastic bottlenecks in system efficiency, especially as the systems grow larger. Solutions to this problem are needed.

Accordingly, there is a need for improved methods of accomplishing MMU trap synchronization that does not require all CPU's in a system to shut down each time there is a memory access instruction that demaps a virtual address or resizes a TSB. In view of the foregoing, there is a need for improved methods and systems for accomplishing MMU synchronization in a multi-processor computing system.

SUMMARY OF THE INVENTION

Broadly speaking, the invention relates to techniques, systems and apparatus for managing virtual address demapping and resizing events in a multi-processor computing system. In accordance with one aspect of the invention, a translation lookaside buffer (TLB) miss handler and a miss exception handler are used to synchronize TLB shootdown events without the need to shut down all CPU's in the system each time a virtual address demapping or TSB resizing occurs. An aspect of the invention uses a context identifier to identify whether translation table entries (TTE's) are "available" to have memory access instructions performed thereon. Where said TTE's are "unavailable" a miss exception handler resolves the "unavailability" and pauses the miss handler until the "unavailability" is resolved, whereupon memory management activities can continue.

The invention can be implemented in numerous ways, including a system, an apparatus, a method, or a computer readable medium. Several embodiments of the invention are discussed below.

One embodiment of the invention is directed to a memory access method for a multi-processor computer system having a plurality of interconnected central processing units (CPU's) controlled by the same operating system. The method involves initiating a memory access instruction concerning a selected virtual address having an associated context identifier. The method determines if the selected virtual address has a corresponding entry in the translation lookaside buffer (TLB). If an appropriate entry is found in the TLB, the entry is accessed and the memory access instruction is performed using information contained in the entry. However, if the selected virtual address is not found in the TLB, a TLB miss handler is invoked to obtain a (translation table entry) TTE that corresponds to the selected virtual address and associated context identifier. The miss handler tests the context identifier (prior to accessing secondary memory assets) to determine if the TTE is available to have memory access instructions performed thereon. If the TTE is available, the TTE is accessed from the secondary memory assets and the TLB and the secondary memory assets are updated as needed and the process returns to initiating a memory access instruction. However, if the TTE is not available a miss exception handler is invoked to resolve a miss exception event that resulted in said unavailability without issuing cross calls that halt the operation of all CPU's in the system. Once the TTE is becomes available the miss handler returns to initiating a memory access instruction. As a computer readable media including computer program code for operating a memory management unit (MMU) of a multi-processor computer system having a plurality of interconnected central processing units (CPU's) controlled by the same operating system and MMU, an embodiment of the invention includes computer readable program instructions enabling the implementation of the above method embodiment.

As an apparatus for implementing memory management process techniques disclosed herein, an apparatus embodiment of the invention is a multi-processor computer system having a plurality of interconnected central processing units (CPU's) controlled by the same operating system. Each CPU having memory caches configured to include translation lookaside buffers (TLB) with entries to include virtual addresses and associated context identifiers. The system includes secondary memory assets including translation storage buffers and page tables, the resources including at least one translation table entry (TTE). The memory management unit (MMU) of the system includes a TLB miss handler and a miss exception handler. The TLB miss handler enables searching the secondary memory assets to find a TTE and testing an associated context identifier to determine if the TTE is available to have a memory access instruction executed thereon. The miss exception handler enables the nature of a TLB miss exception to be determined and determining that a miss exception has been resolved. Also, the miss exception handler pauses the operation of the miss exception handler until the miss exception is resolved. The embodiments of the invention also include various methods for resolving miss exception events including unassigned context identifier miss exceptions, miss exceptions that occur when a virtual address maps to a locked shared memory resource, and miss exceptions that occur when a virtual address is associated with a TSB that is undergoing a resizing operation.

Another embodiment includes a method of accessing translation table entries (TTE's) in secondary memory assets of a memory management unit of a multi-processor computer system where the TTE's correspond to a virtual address and associated context identifier. The method involves requesting a translation for the virtual address wherein the TTE is to be found in a secondary memory asset. The associated context identifier is tested to determine whether the TTE is available to have a memory access instruction executed upon it. Available TTE's are located and accessed from the secondary memory asset. Translation lookaside buffer (TLB) and the secondary memory assets are updated as needed using TTE information and then the method returns to operation of the memory management unit. Alternatively, for unavailable TTE's, the source of unavailability is determined and then resolved for unavailable TTE's. Then the method returns to operation of the memory management unit.

An embodiment of the invention includes a method of handling translation lookaside buffer (TLB) miss exceptions in a memory management unit of a multi-processor computer system having a plurality of CPU's. This involves determining that a virtual address requested by a process corresponds to a TLB miss exception event and invoking a miss exception handler. The miss exception handler determines the nature of the TLB miss exception event and can resolve a miss exception event. Advantageously, embodiments of the method pause the operation of the miss exception handler while the miss exception event is being resolved.

Another embodiment of the invention includes a method of accomplishing TLB shootdown for a shared memory resource in a memory management unit of a multi-processor computer system. The method involves receiving a memory access instruction for a translation table entry (TTE) that is shared by more than one virtual address, each virtual address space having a corresponding context identifier. Virtual addresses that share the same TTE are identified. Locks are activated for each virtual address space that shares the same TTE to prevent other processes from accessing the TTE while the lock is activated. The corresponding context identifier is changed for each virtual address space to indicate that the TTE is unavailable to have memory access instructions performed thereon. A memory access instruction is performed on the TTE. The locks are then released and context identifier is freed for the virtual address space to indicate that the associated context identifier is now available to be assigned to other processes.

Yet another embodiment of the invention includes a method of resizing a translation storage buffer (TSB) in a memory management unit of a multi-processor computer system. The method involves receiving a resize instruction for a TSB. The TSB is locked to prevent other threads from accessing entries in the TSB. The context identifier is changed to indicate that the TSB is unavailable. The TSB is resized and the locks are released. The affected context identifier is changed back to its original configuration.

The implementations of the invention are numerous. Different embodiments or implementations may have one or more of the following attributes. Embodiments of the invention can be implemented so that they do not require all CPU's to stop operating whenever a demapping event occurs. Additionally, the processes and threads only pause when an unavailable TTE is accessed.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 2.1–2.3 illustrate a method embodiment for accommodating memory operations in a multi-processor computing environment in accordance with one embodiment of the present invention.

FIG. 4.1–4.4 illustrate a method embodiment for implementing a miss exception handler in a multi-processor computing environment in accordance with one embodiment of the present invention.

DETAILED DESCRIPTION OF THE INVENTION

The invention relates to techniques and systems for virtual address memory management in multi-processor computer systems. Embodiments of the invention are discussed below with reference to FIGS. 1–7B. However, those skilled in the art will readily appreciate that the detailed description given herein with respect to these figures is for explanatory purposes as the invention extends beyond these limited embodiments.

Figure 1:
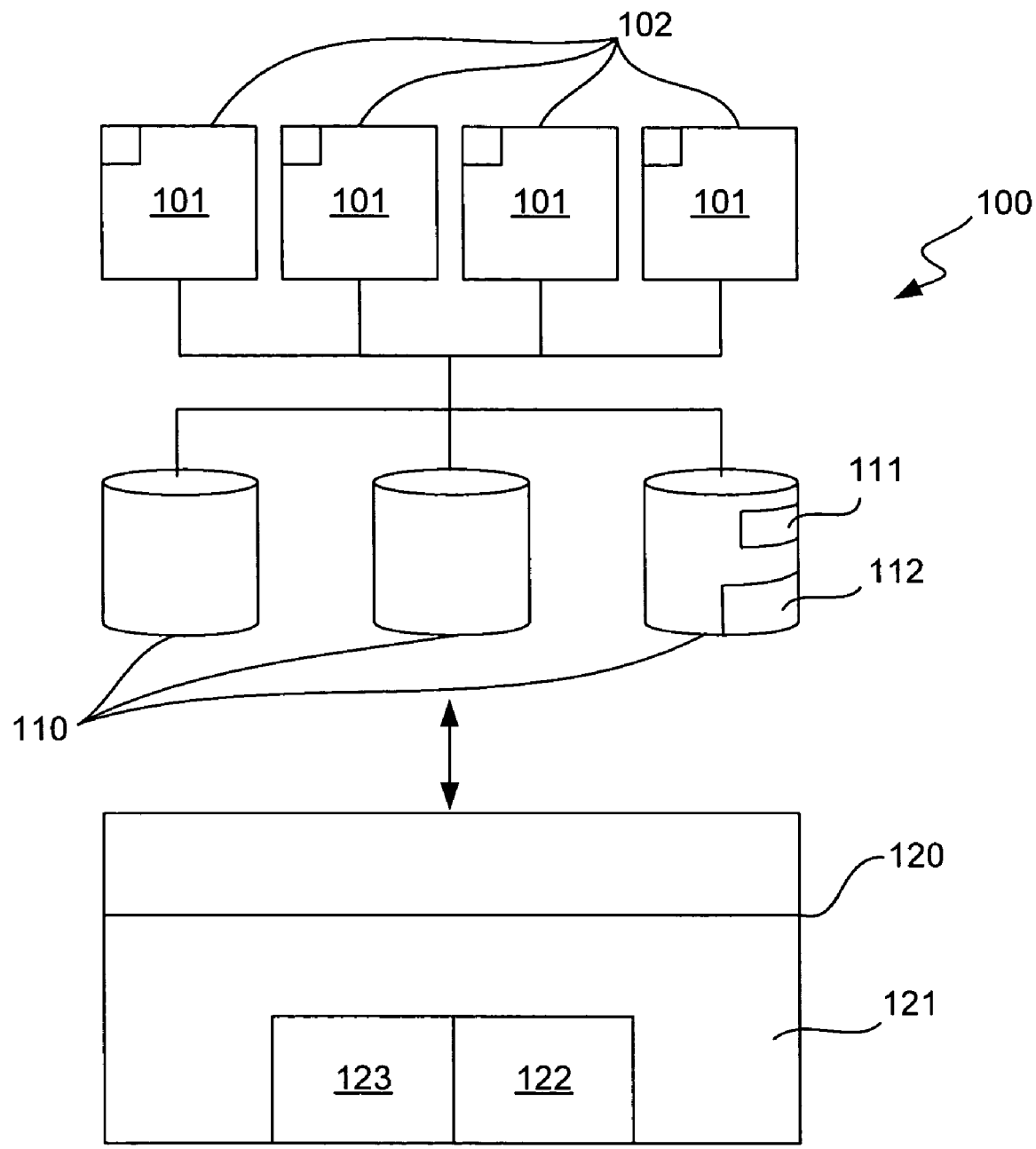
FIG. 1 illustrates an embodiment of a multi-processor computing environment suitable for implementing the principles of the invention.

In accordance with one aspect of the invention a multi-processor computing system and computing environment is disclosed. FIG. 1 depicts one embodiment of such a multi-processor computer system 100. The depicted system includes a plurality of interconnected central processing units (CPU's) 101 controlled by the same operating system. Computer systems can include systems where the CPU's 101 are distributed over a large spatial distance (e.g., distributed or networked computer systems (e.g., LAN's, WAN's, etc.)). The operating system 120 includes a memory management unit (MMU) 121 having a translation lookaside buffer (TLB) miss handler 122 and a miss exception handler 123. Typically, a single operating system operates all of the CPU's of such multi-processor computer systems 100. Embodiments of the invention can be implemented by many types of SSM or SMP systems. Examples include, without limitation, X86 systems as well as SSM system symmetric multiprocessor system architectures designed by Motorola, IBM, and Microsoft (e.g., NT systems). Linux based systems can also take advantage of the principles of the invention. As explained above, SPARC architectures are suitable for implementing the principles of the invention. One example of a SPARC® compliant system is a Solaris® based system.

Each CPU 101 includes a memory cache configured to include a translation lookaside buffer (TLB) 102 having entries configured to include virtual addresses and associated context identifiers for those virtual addresses as well as physical address translations and attribute information. The system includes secondary memory assets 110 that can include translation storage buffers (TSB's) 111 and page tables 112. Such secondary resources are typically stored in random access memory (RAM) but can also be stored as disk memory or at other memory locations. As is known to persons having ordinary skill in the art, a TSB is a specific location in memory specifically dedicated to handle the virtual address space for a specified process (or thread). Because this location is always known and densely packed, memory access to the virtual address space of such TSB's is quicker than for other RAM memory. Such TSB's 111 and page tables 112 can each include many translation table entries (TTE). Each TTE includes translation information concerning a virtual address and associated context identifier. Each TTE includes a physical address translation and attribute information for each corresponding virtual address and context identifier. Other information associated with the TTE's can also be stored in other memory, for example, virtual address space identifiers (VASI)(also commonly referred to as HAT pointers). Information stored in the VASI can include the "busy" or "lock" protection status of a range of TTE' S. One difficulty with information stored in a VASI is that it is not stored close to the TTE. Therefore, it can take a significant amount of time (in computer processing terms) to access this information. Consequently, the less access to the VASI information is required, the faster a system can run.

As previously indicated, the MMU 121 includes a TLB miss handler 122 and a miss exception handler 123.

The TLB miss handler is a piece of software code configured to facilitate corrective action when a TLB miss occurs (i.e., when a memory access instruction accesses a virtual address that has no physical address translation currently resident in the TLB or when for some reason the required translation information cannot be found in the TLB). When a TLB miss occurs, the TLB miss handler 122 is invoked. The TLB miss handler 122 tests the context identifier associated with the virtual address to determine if a TTE (having the necessary translation information) is available to have a memory access instruction executed thereon. Some embodiments make advantageous use of this feature to perform context testing before the searching of the secondary memory assets for the TTE. Thus, the availability/unavailability of the TTE can be assessed prior to searching secondary memory assets. This can significantly increase system efficiencies. The availability or unavailability of TTE entries will be treated more fully hereinbelow. Once it has been determined that a selected TTE is available, the TLB miss handler 122 searches secondary memory assets 110 (e.g., the TSB's 111 and page tables 112) to find the selected TTE having the necessary translation information. The selected TTE is related to the virtual address (and its associated context identifier) that is the subject of the TLB miss and typically contains the required physical address translation information as well as other information (e.g., attribute information) concerning the virtual address.

In cases where context testing reveals that selected TTE is unavailable, the TLB miss handler 122 invokes a miss exception handler 123 to facilitate the resolution of the TLB miss exception that has rendered the TTE unavailable. The exception handler determines the nature of the TLB miss exception that has rendered the TTE unavailable. Based on this determination, the exception handler 123 operates to resolve the unavailability. The exception handler 123 can determine that the miss exception has been resolved, resolve the miss exception, or it can selectively pause the operation of the exception handler 123, if needed, until the miss exception is resolved and the TTE becomes available to have memory access instructions performed on it again.

FIG. 2 illustrates an exemplary flow diagram that describes a method 200 embodiment used to conduct memory operations in a multi-processor computer in accordance with the principles of the invention. The method can be used by any multi-processor system where the CPU's are controlled by a single operating system. A non-exclusive example of such a system is illustrated by FIG. 1. The method 200 can be used by many types of multiprocessor systems including, but not limited to, SPARC® compliant systems (e.g., a Solaris® based system) as well as other multi-processor systems. The method 200 can be used by SPARC® compliant systems (e.g., a Solaris® based system) as well as other multi-processor systems. In such a system a memory access instruction is initiated (Step 201). The instruction is to be executed using a selected virtual address and requires a physical address translation for the virtual address and its associated context identifier. The translation lookaside buffer (TLB) is searched to find the selected virtual address and its associated context identifier (Step 203). A determination is made as to whether the selected virtual address and its associated context identifier are found in the TLB (Step 205).

Where the selected virtual address and its associated context identifier are located in the TLB, a translation for the selected virtual address and its associated context identifier are accessed (Step 207). The translation commonly includes the physical address of the desired physical memory resource sought. Additionally, the translation can include attribute information and other types of information. Once the translation is accessed, the memory access instruction (initiated in Step 201) is now performed using the translation (Step 208). This completes the process (Step 209).

Where the selected virtual address and its associated context identifier are not located in the TLB, the method tests the context identifier that is associated with the selected virtual address (Step 211). Testing the context identifier at this stage (prior to searching the secondary memory assets) allows an "up front" determination as to whether a sought after translation table entry (TTE) located in the secondary memory assets is available to have memory access instructions performed on it. Thus, an availability determination can be made prior to the time consuming search operations required to find the TTE in the secondary memory assets.

A determination is made as to whether the sought after TTE (i.e., the TTE that includes the translation information for the selected virtual address and context identifier) is the subject of a miss exception event or not (Step 213). If the sought after TTE is the subject of a miss exception event (the nature of which will be described in greater detail below) it is considered unavailable to have memory access instructions performed thereon. Otherwise the TTE is available to have memory access instructions performed thereon.

Where testing the context identifier reveals that the sought after TTE is available to have memory access instructions performed thereon the appropriate TTE is accessed and the desired translation information is obtained from the secondary memory assets (e.g., a TSB or page table) (Step 215). The TLB is updated with the appropriate translation (and such other information that may be required) from the TTE (Step 217). Additionally, selected secondary memory assets are updated with the appropriate translation as needed from the TTE (Step 217). For example, if the desired TTE is found in a page table, the information contained in the TTE is used to update a TTE in the TSB as well as update the associated virtual address in the TLB. Once the appropriate updating is completed the method returns to Step 201 where memory access instructions are initiated. Typically, this means that the TLB will be accessed again, but now the appropriate translation to a physical address will be found in the TLB and the process will proceed in due course.

Where testing the context identifier reveals that the sought after TTE corresponds to miss exception (i.e., the TTE is not available to have memory access instructions performed thereon) the process proceeds to Step 221 (Step 214). The nature of the miss exception is determined (Step 221). This process will be described in greater detail below. Once the cause of the miss exception is determined, the method facilitates resolution of the miss exception and pauses the process as needed until the miss exception has been resolved (Step 223). Once the miss exception is resolved the method returns to Step 201 where memory access instructions are initiated (Step 225). Typically, this means that the TLB will be accessed again, but now the appropriate translation to a physical address will be found in the TLB and the process will proceed in due course.

Figure 3:
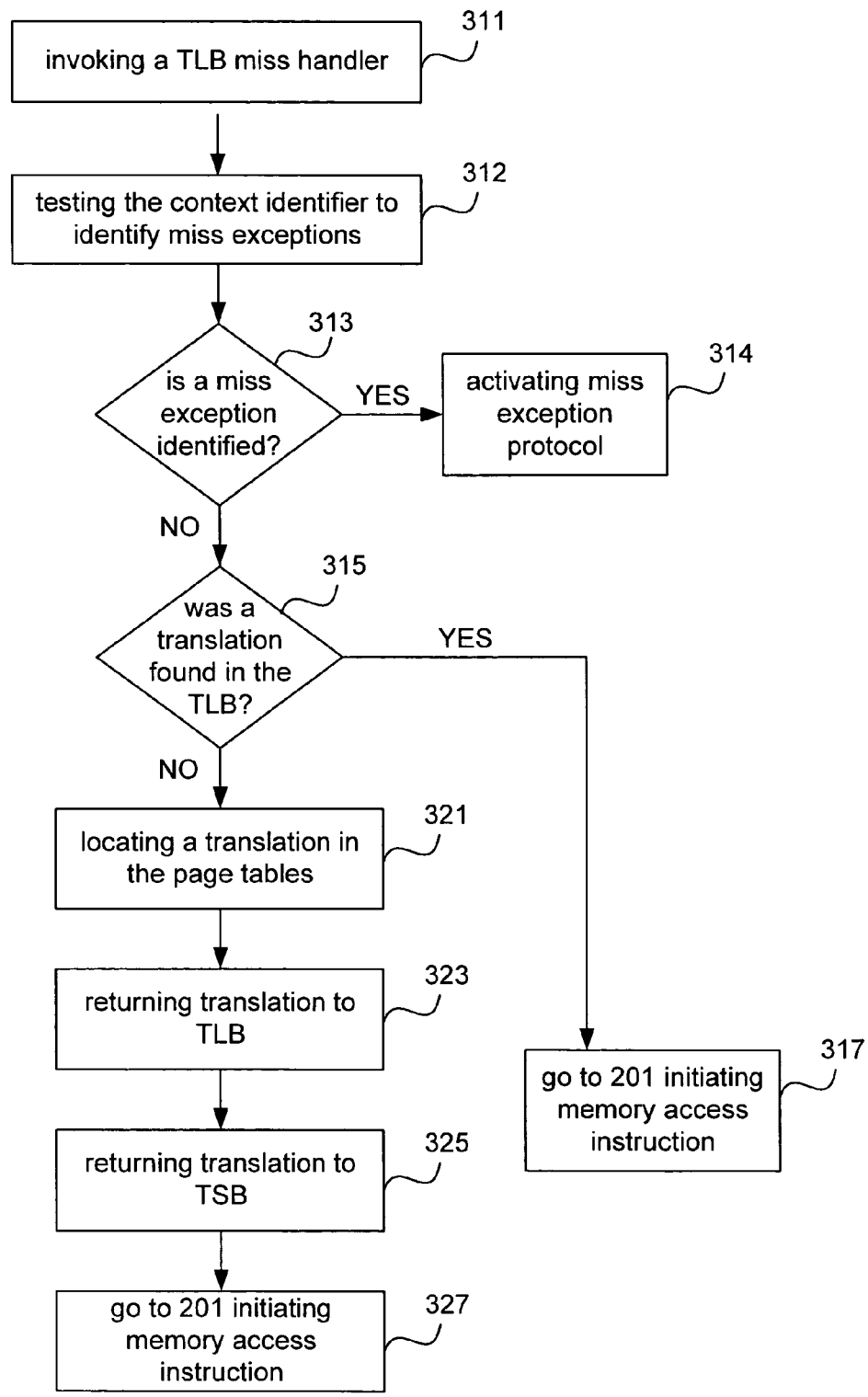
FIG. 3 illustrates a method embodiment for implementing a TLB miss handler in a multi-processor computing environment in accordance with one embodiment of the present invention.

FIG. 3 illustrates an embodiment describing a mode of operation for a TLB miss handler that can execute certain operations (Steps 211–219) described with respect to FIG. 2. Referring to Step 211, testing the context identifier, includes the invoking a TLB miss handler (Step 311) and testing the context identifier to determine if the affected TTE is a miss exception (i.e., is unavailable to have a memory access instruction performed thereon) (Step 312). This testing can be done by accessing a value included in the context identifier. This value is used to identify the context of the associated virtual address. For example, a value of "0" can be used to indicate the virtual address is part of the kernel. Also, values of "2" or greater can each be used to specifically identify the process to which a virtual address pertains, thereby assigning a context to interpret the virtual address. Also, a value of "1" can be assigned to indicate that the virtual address space is subject to a "miss exception" and is therefore unavailable to have memory access instructions performed thereon. As explained previously, the context identifier can be used to determine TTE availability for a number of reasons. First, the TTE can be assessed to determine if it is "available" prior to actually searching for the TTE in the secondary memory assets. If the TTE is unavailable (the subject of a miss exception) the method will not waste time searching for it until it becomes available. Additionally, by including the miss exception information in the context identifier it can be rapidly accessed because the context identifier is located in the registers of the CPU's rather than out in secondary memory assets where it would otherwise have to be obtained.

The TLB miss handler determines whether the TTE is available or whether it is subject to a miss exception (and is unavailable) (Step 313). Where the TTE is subject to a miss exception (and hence unavailable) the process proceeds to a miss exception protocol (Step 314) which is briefly described above with respect to FIG. 2 (Steps 221–225) or in a more detailed embodiment in FIG. 4.

Where it is determined that the TTE is available to have memory access instructions performed thereon the operations of obtaining the TTE information and updating (Steps 215 and 217) are performed. In this embodiment these operations include the following. Searching the translation storage buffers (TSB) for a TTE that corresponds to the subject virtual address and associated context identifier (Step 315). Where a TTE is found in the TSB that matches the subject virtual address and associated context identifier, information (including the translation to the physical memory address) is accessed and returned to the TLB (Step 317). Once the appropriate updating of the TSB is completed the method returns to Step 201 where memory access instructions are initiated (Step 329).

If the appropriate TTE is not found in the TSB, a TTE that corresponds to the subject virtual address and associated context identifier is located in the page tables (Step 321). When a TTE is found in the page tables that matches the subject virtual address and associated context identifier, information (including the translation to the physical memory address) is accessed and returned to the TLB (Step 323). Also, the TSB is updated to reflect the updating of the TLB with the translations (Step 325). Once the appropriate updating of the TLB and TSB is completed, the method returns to Step 201 where memory access instructions are initiated (Step 329).

FIG. 4 describes one embodiment of a method for operating a miss exception handler in accordance with the principles of the invention. The described embodiment is a more detailed implementation of the method described in FIG. 2 (Steps 221–225). When the method tests the context identifier and determines that the context identifier pertains to a miss exception (i.e., the TTE is unavailable to have memory access instructions performed thereon) a miss exception protocol is activated (e.g., Step 314).

The method includes invoking a miss exception handler (Step 401). The miss exception handler is a piece of software code configured to facilitate the resolution of TLB miss exceptions. Moreover, the exception handler can selectively pause while unavailable TTE's are resolved and become available. This can be used to avoid the requirement that all CPU's to be cross-called and taken off-line each time a TTE virtual address is demapped or becomes otherwise unavailable to have memory access instructions performed thereon. The miss handler determines the nature of the miss exception (Step 403). Once the type of miss exception is determined a protocol is invoked for handling that type of miss exception. This embodiment describes protocols for resolving three different types of miss exceptions. One such exception is a case where the subject virtual address has not yet been assigned a context identifier. For the purposes of this patent this case is referred to as an unassigned context identifier exception. Another exception refers to shared memory resource situations. A shared memory resource is, for example, when a TTE is associated with more than one virtual address. Thus, a change to the shared TTE affects more that one virtual address. So while the shared memory resource (e.g., a TTE) is being demapped the other virtual addresses that share the same TTE cannot have memory access instructions performed thereon. This case is referred to as a shared memory exception. Conventional solutions to such situations involve taking all CPU's offline when such demapping occurs and keeping the CPU's offline until the demapping is complete. The present invention only requires that certain processes (only those using the affected shared memory resource) be temporarily halted (not all CPU's) until the demapping of shared memory resource is completed. Another exception refers to TSB resizing events (so-called resizing exceptions). In modern SPARC® compliant systems, as well as other multi-processor computer systems, the TSB's are subjected to size changes and relocations far more frequently than for previous types of systems. In the past these resize operations require all CPU's be taken offline each time resize operations are performed. With the increase in the number of CPU's, processes, and threads operating in a multi-processors systems, resize operations of one sort or another are happening almost all the time. By having to take all CPU's offline each time a resize operation occurs the CPU's of the system cannot perform much work. Thus, many of the efficiencies gained by a multi-processor system are lost due to CPU inactivity during resizing events. The present invention addresses this problem by only requiring that certain processes (only those affected by the TSB resize activity) be temporarily halted (not all CPU's) until the resizing is complete.

Continuing with FIG. 4, the exception handler determines the nature of the miss exception (Step 403). Wherein the exception handler determines that an unassigned context identifier exception has occurred it implements an unassigned context identifier exception protocol (Step 421). An available context identifier (one not being used by some other process) is then assigned to a virtual address space for the process (Step 423) (e.g., in the example above, assigning a value other than "1" which corresponds to the affected process). A portion of memory (typically, RAM) is assigned to a TSB for the virtual address and context identifier (Step 425). Memory assets are updated to reflect the assignment of the context identifier and TSB virtual address space assignment (Step 426). Typically, this includes updating the TLB, TSB, and page tables. Once this is done, the exception has been resolved and the method returns to Step 201 where memory access instructions are initiated (Step 427). Such memory access instructions can be initiated, for example, by an MMU. Typically, the virtual address and context identifier can now be found in the TLB.

Still referring to FIG. 4, as before, the exception handler determines the nature of the miss exception (Step 403), and if the exception handler determines that a shared memory exception has occurred it implements a shared memory exception protocol (Step 431). In such a case, the exception handler has identified that a shared memory resource has been locked (commonly, this is in the form a locked virtual address space in a page table that corresponds to shared TTE) in a page table and is therefore unavailable to have memory access instructions performed thereon. This prevents processes that share the TTE from accessing the TTE. Upon determining that the shared memory resource is locked, the exception handler temporarily pauses (sleeps) (Step 433). Again, as explained above, this avoids the requirement that every CPU in the system to go offline until the demapping operation is complete. It only requires that processes attempting to access the affected shared memory resource undergo a sleep event for the exception handler. The exception handler "sleeps" until the exception handler determines that the lock has been released on the shared memory resource (e.g., the shared TTE) (Step 435). At this point the exception handler wakes up and continues operation (Step 435). This release of the lock is indicative that the event (e.g., demapping) that caused the miss exception is resolved and the TTE is now available to have memory access instructions performed thereon. Once the exception handler awakes the method returns to Step 201 where memory access instructions are initiated (Step 437). Such memory access instructions can be initiated, for example, by an MMU. Typically, the virtual address and context identifier can now be found in the TLB and no miss exception should be present.

Still referring to FIG. 4, as before, the exception handler determines the nature of the miss exception (Step 403). If the exception handler determines that a resizing exception has occurred that effects the sought after TTE it implements a resizing exception protocol (Step 441). In such a case, the exception handler has identified that the sought after TTE is part of a TSB undergoing resizing and is therefore unavailable to have memory access instructions performed thereon. This prevents the desired TTE from being accessed. Upon determining that the resize exception has occurred, the exception handler determines if the virtual address space of TSB undergoing resizing is locked (commonly with mutex locking) (Step 443). This can be determined typically by consulting the VASI for the virtual address space. Again, such a process is does not require every CPU in the system to go offline until the resizing operation is complete. It only requires that processes attempting to access the affected TSB virtual address space wait while the affected exception handler sleeps.

If it is determined that the TSB virtual address space is locked, the exception handler sleeps until the lock on the TSB virtual address space is released (Step 445). Once the lock on the TSB virtual address space is released, the exception handler "awakens" and then locks the TSB virtual address space (Step 447). Additionally, if at Step 443 it is determined that the TSB virtual address space in not locked, the exception handler locks the TSB virtual address space as in Step 447. Once the TSB virtual address space has been locked in Step 447, a determination is made as to whether the (newly resized) TSB has been assigned a specified portion in memory (Step 449). Typically, this determination can be made by consulting the virtual address space identifiers (VASI's) for the affected virtual addresses.

In the case where the TSB has been assigned a memory location, the locks for the TSB virtual address space are released (Step 451) and the method returns to Step 201 where memory access instructions are initiated (Step 453). Typically, the virtual address and context identifier can now be found in the TLB and no miss exception should be present.

In the case where the TSB has not been assigned a memory location, a specific portion of memory is assigned to the TSB virtual address space (Step 461). Once the TSB virtual address space is assigned a memory location the locks for the TSB virtual address space are released (Step 463) and the method returns to Step 201 where memory access instructions are initiated (Step 465). Typically, the virtual address and context identifier can now be found in the TLB and no miss exception should be present.

Figure 5:
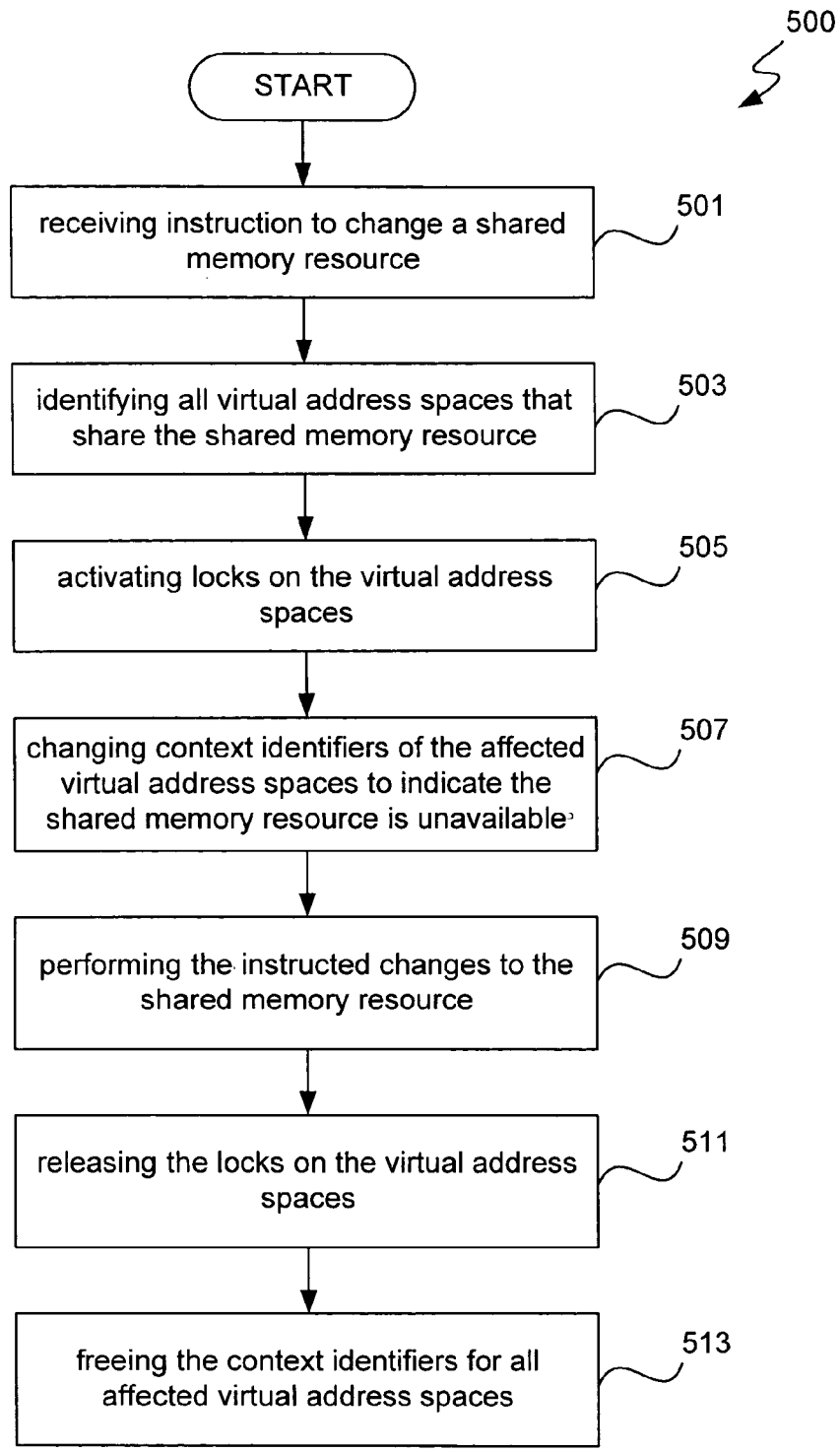
FIG. 5 illustrates a method embodiment for executing a set of operations in a MMU to accomplish a TLB shootdown event in a multi-processor computer having shared memory resources in accordance with the principles of the invention.

FIG. 5 illustrates a method embodiment describing a methodology for executing a set of operations in a MMU to accomplish a TLB shootdown event in a multi-processor computer having shared memory resources. The method 500 begins with a MMU receiving an instruction to change a shared memory resource (e.g., a TTE that is shared by two or more virtual address spaces) (Step 501). Commonly, such instructions include, but are not limited to, demapping instructions, remapping instructions, alterations of the TTE attributes, and the like. For example, altering the attributes can include altering the "permissions" for the TTE. A "read-only" TTE can be changed to a writeable TTE, for example. All the virtual address spaces that share the shared memory resource (e.g., the TTE) are identified (Step 503). A lock is activated for each virtual address space referencing the shared memory resource (e.g., the TTE) (thereby preventing the virtual address spaces (and the affected TTE) from being accessing until the memory access instruction is complete)(Step 505). The context identifier for each of the affected virtual address spaces is changed from its old value to a new value that reflects the unavailability of the shared memory resource (e.g., the TTE) (i.e., it is flagged as a miss exception) (Step 507). To use an earlier example, the context identifier can be given a value of "1". The changes are made to the shared memory resource (e.g., a TTE) (Step 509). The locks are released on the affected virtual address spaces (Step 511). The context identifiers for all affected virtual address spaces are freed (Step 513). In this circumstance freeing a context identifier means that the context identifier is changed from unavailable status and returned to the system for reallocation as a new context identifier. All TLB entries having the old context identifier are invalidated throughout the system and the old context identifier value is marked a being reassignable in new processes.

Figure 6:
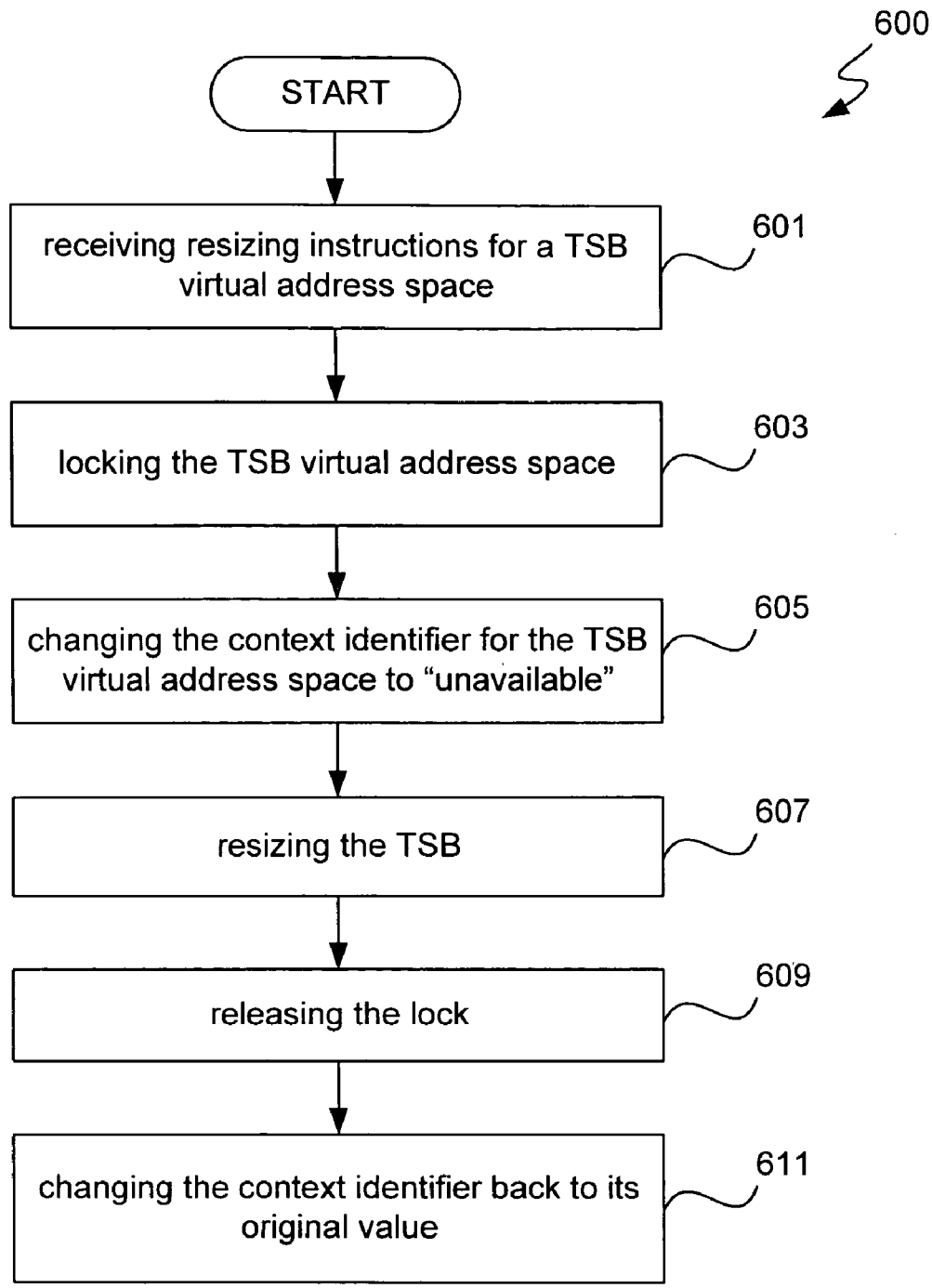
FIG. 6 illustrates a method embodiment describing a methodology for executing a set of operations in a MMU to accomplish a TSB resizing event in a multi-processor computer in accordance with the principles of the invention.

FIG. 6 illustrates a method embodiment describing a methodology for executing a set of operations in a MMU to accomplish a TSB resizing event in a multi-processor computer. The method 600 begins with a MMU receiving a memory access instruction corresponding to an instruction to resize a TSB (Step 601). The virtual address space of the TSB is identified and a lock is activated for the virtual address space (thereby preventing these virtual addresses from having memory access instruction executed on them during the resizing operation) (Step 603). A context identifier for the affected virtual address space is changed from its old value to a new value that reflects the unavailability of the affected virtual addresses (i.e., they are flagged as a miss exceptions) (Step 605). Using the earlier example, the context identifier can be given a value of "1". The resizing instruction is performed on the affected virtual addresses (Step 607). The locks are released for the TSB (Step 609). The context identifiers are returned to its previous value (Step 611). If desired the context identifiers can be returned to their previous value (611) prior to releasing the locks on the TSB (609). The process is now complete.

Figure 7A:
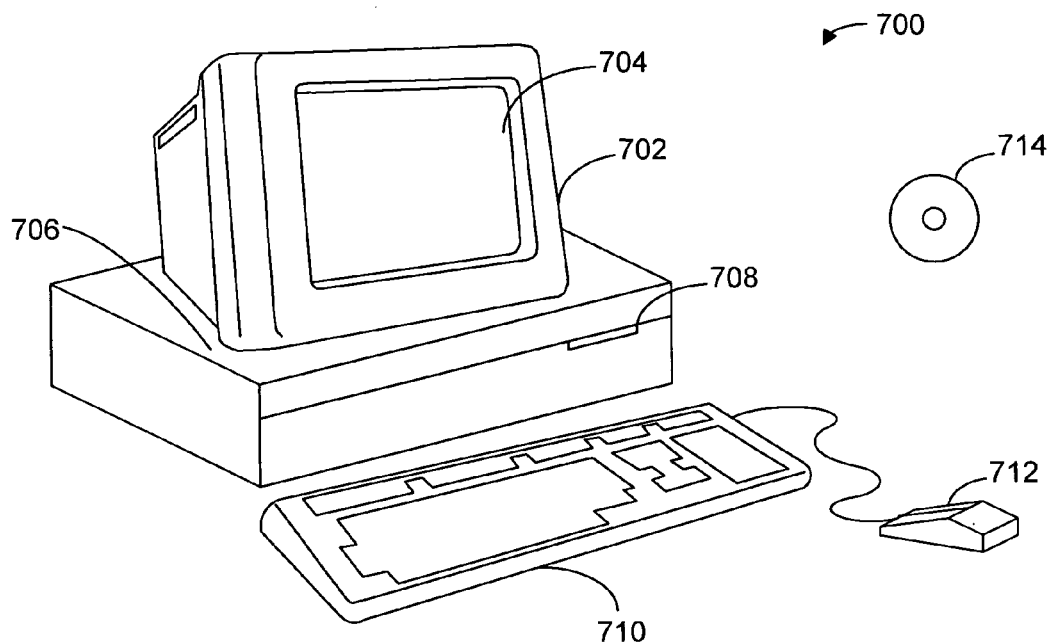
FIGS. 7A and 7B illustrate an example of a computer system that may be used in accordance with the invention.
Figure 7B:
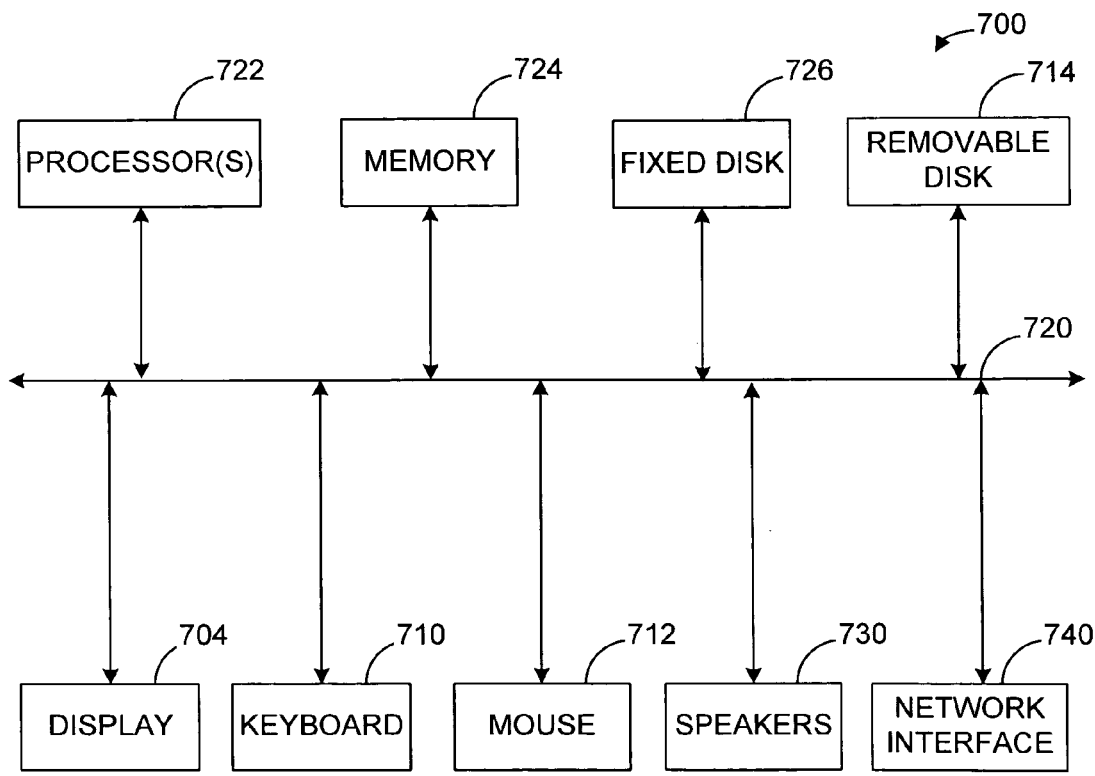

FIGS. 7A and 7B illustrate an example of a multi-processor computer system 700 that may be used in accordance with the invention. FIG. 7A shows a computer system 700 that includes a display 702, screen 704, cabinet 706, keyboard 710, and mouse 712. Mouse 712 may have one or more buttons for interacting with a graphical user interface. Cabinet 706 can house a CD-ROM drive 708, system memory and a hard drive (see FIG. 7B) which may be utilized to store and retrieve software programs incorporating computer code that implements the invention, data for use with the invention, and the like. Although CD-ROM 708 is shown as an exemplary computer readable storage medium, other computer readable storage media including floppy disk, DVD, tape, flash memory, system memory, and hard drive may be utilized. Additionally, a data signal embodied in a carrier wave (e.g., in a network including the Internet) may be the computer readable storage medium. In one implementation, an operating system for the computer system 700 is provided in the system memory, the hard drive, the CD-ROM 708 or other computer readable storage medium and serves to incorporate the computer code that implements the invention (e.g., MMU system). It is to be remembered that the operating system is configured so it controls all of the processors of the system. It should be noted that other devices (e.g., printers, scanners, etc.) may be present in the computer system 700.

FIG. 7B shows a system block diagram of computer system 700 used to execute the software of an embodiment of the invention. The computer system 700 includes monitor 704, keyboard 710, and mouse 712. Computer system 700 further includes subsystems, such as a plurality of central processors (CPU's) 722 (including cache memory), system memory 724, fixed storage 726 (e.g., hard drive), removable storage 714 (e.g., CD-ROM drive), display adapter, sound card and speakers 730, and network interface 740. The central processors 751, for example, can execute computer program code (e.g., an operating system) to implement the invention. An operating system is normally (but not necessarily) resident in the system memory 724 during its execution. Other computer systems suitable for use with the invention may include additional or fewer subsystems.

The system bus architecture of computer system 700 is represented by arrows 720. However, these arrows are illustrative of any interconnection scheme serving to link the subsystems. For example, a local bus could be utilized to connect the central processor to the system memory and display adapter. Computer system 700 shown in FIG. 7B is but an example of a computer system suitable for use with the invention. Other computer architectures having different configurations of subsystems may also be utilized.

The invention can use a combination of hardware and software components. The software can be embodied as computer readable code (or computer program code) on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over a network coupled computer systems so that the computer readable code is stored and executed in a distributed fashion.

Different embodiments or implementations may have one or more of the following advantages. Embodiments of the invention can accommodate TLB shootdown events without having to pause operation of all CPU's in the system each time a shootdown event occurs. Embodiments can use the context identifier to perform memory operations and determine invalid context (i.e., unavailable TTE) efficiently, thereby reducing the amount of time wasted by the CPU's.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of handling translation lookaside buffer (TLB) miss exceptions in a memory management unit of a multi-processor computer system having a plurality of Central Processing Units (CPU's), the method comprising:
   initiating an access instruction;
   determining that a TLB miss exception event has occurred, wherein determining that a TLB miss exception event has occurred includes testing a context identifier for the affected virtual address to determine whether a TLB miss exception has occurred;

invoking a miss exception handler;
determining the nature of the TLB miss exception event;
resolving the miss exception event;
returning to initiating an access instruction;
wherein determining the nature of the TLB miss exception event includes testing the context identifier for the affected virtual address to determine whether the TLB miss exception event results from one of an unassigned context identifier, a translation storage buffer (TSB) resizing operation that affects the virtual address, and an unmapping of a shared translation table entry (TTE) that is associated with the virtual address wherein the TTE comprises a shared memory resource;
wherein resolving the miss exception events includes resolving each type of miss exception event in accordance with specified miss exception resolution protocol for each type of miss exception event.

2. The method as recited in claim 1 wherein the resolving of the miss exception event includes pausing the miss exception handler until the miss exception event is resolved.

3. The method of claim 1 wherein said testing the context identifier determines that said unavailability results from a miss exception due to an unassigned context identifier, and
wherein resolving the unassigned context identifier miss exception event further includes the steps of:
assigning a context identifier value to a virtual address space that is to be associated with a process that contains the virtual address;
assigning selected portion of memory to a TSB that is to be associated with the virtual address space having the assigned context identifier;
updating at least one of secondary memory assets and the TLB with TSB and context identifier information; and
returning to initiating an access instruction.

4. The method of claim 1 wherein said testing the context identifier determines that said unavailability results from a miss exception due to a situation wherein the affected virtual address maps to a shared memory resource, and
wherein resolving the miss exception event further includes the steps of:
determining if the shared memory resource is locked;
if the shared memory resource is not locked,
returning to initiating an access instruction; and
if the shared memory resource is locked,
pausing the exception handler until the shared memory resource becomes unlocked; and
returning to initiating an access instruction when the shared memory resource becomes unlocked.

5. The method of claim 4 wherein said shared memory resource comprises a translation table entry (TTE).

6. The method of claim 1 wherein testing the context identifier determines that said unavailability results from a miss exception due to a situation wherein the virtual address is associated with a TSB that is undergoing a resizing operation; and
wherein resolving the miss exception event further includes the steps of:
A) determining if the virtual address space of the TSB undergoing resizing is locked;
1) in a case wherein the virtual address space of the TSB undergoing resizing is locked,
i) pausing the exception handler until the virtual address space of the TSB undergoing resizing becomes unlocked;
ii) locking the virtual address space of the TSB undergoing resizing;
2) in a case wherein the virtual address space of the TSB undergoing resizing is unlocked,
i) locking the virtual address space of the TSB undergoing resizing;
B) once the virtual address space of the TSB undergoing resizing has been locked by one of 1)(ii) and 2)(i), determining whether the TSB undergoing resizing has been assigned a specified location in memory;
1) if the TSB undergoing resizing has been assigned a specified location in memory,
i) releasing the lock on the virtual address space of the TSB undergoing resizing; and
ii) returning to initiating an access instruction;
2) if the TSB undergoing resizing has not been assigned a specified location in memory,
i) assigning a specified portion of memory to the TSB undergoing resizing;
ii) releasing the lock on the virtual address space of the TSB undergoing resizing; and
iii) returning to initiating an access instruction.

7. A method of accessing translation table entries (TTE's) in secondary memory assets of a memory management unit of a multi-processor computer system, the method comprising:
A) requesting that a translation be found for a selected virtual address having an associated context identifier wherein the translation is to be found in a secondary memory asset of a memory management unit;
B) testing the associated context identifier, prior to searching a secondary memory asset, to determine whether a TTE corresponding to the virtual address and the associated context identifier is available to have a memory access instruction executed upon it;
1) wherein if testing determines the TTE is available to have a memory access instruction executed upon it:
locating the TTE using the virtual address and context identifier;
accessing the TTE from the secondary memory asset;
updating a translation lookaside buffer (TLB) and the secondary memory asset as needed;
returning to initiating an access instruction;
2) wherein if testing determines the TTE is not available to have a memory access instruction executed upon it:
determining a source of unavailability;
resolving the unavailability;
returning to initiating an access instruction,
wherein the secondary memory assets include at least one translation storage buffer (TSB) and at least one page table, and
wherein resolving the unavailability includes:
determining the nature of the unavailability; and
where it is determined that the cause of the unavailability is a TSB resizing operation that affects the virtual address for which the translation is sought;
pausing until the TSB resizing operation is completed; and
returning to initiating an access instruction.

8. A method as in claim 7 wherein the secondary memory assets include at least one translation storage buffer (TSB) and at least one page table, and wherein resolving the unavailability includes:
  determining the nature of the unavailability; and
  where it is determined that the cause of the unavailability is a demapping operation for a TTE that is shared by the virtual address for which the translation is sought,
    pausing until the TTE demapping operation is completed; and
    returning to initiating an access instruction.

9. A method of accomplishing memory management of miss exceptions in a memory management unit of a multi-processor computer system, the method comprising;
  determining that a miss exception event has occurred, wherein the miss exception event concerns one of: an unassigned context identifier event, a memory access event changing a shared memory resource, and a translation storage buffer (TSB) resizing event;
  resolving the miss exception event in accordance with a miss event resolution protocol suitable for resolving the received miss exception event; and
  wherein said determining determines that the miss exception event comprises an instruction to change a translation table entry (TTE) that is shared by more than one virtual address space wherein each virtual address space has an associated context identifier; and
  wherein resolving the miss exception event in accordance with a miss event resolution protocol comprises:
    identifying virtual address spaces that share the same TTE;
    activating a lock for each virtual address space that shares the same TTE to prevent other processes from accessing the TTE while the lock is activated;
    changing the corresponding context identifier for each virtual address space that shares the same TTE thereby making the associated TTE unavailable to have memory access instructions performed thereon;
    performing the changes on the TTE;
    releasing the locks on each locked virtual address space; and
    freeing the corresponding context identifiers for each affected virtual address space.

10. The method of claim 9 wherein said determining determines that the miss exception event comprises a miss exception event comprises an instruction to resize a translation storage buffer (TSB); and
  wherein resolving the miss exception event in accordance with a miss event resolution protocol comprises:
    activating a lock for the TSB to prevent other processes from accessing entries in the TSB while the lock is activated;
    changing the corresponding context identifier to indicate that the TSB virtual address space is unavailable to have memory access instructions performed thereon;
    resizing the TSB;
    changing the corresponding context identifier back to its original configuration; and
    releasing the lock on the TSB.

11. The method of claim 9 wherein said determining determines that the miss exception event comprises an instruction concerning an unassigned context identifier; and
  wherein resolving the miss exception event in accordance with a miss event resolution protocol comprises:
    assigning a context identifier for a virtual address space associated with a TSB; and
    assigning a portion of memory to the TSB.

12. A recordable computer readable medium including computing program code for handling translation lookaside buffer (TLB) miss exceptions in a memory management unit of a multi-processor computer system having a plurality of Central Processing Units (CPU's), wherein said computer readable medium comprising:
  computer program code for initiating an access instruction;
  computer program code for determining that a TLB miss exception event has occurred, wherein determining that a TLB miss exception event has occurred includes testing a context identifier for the affected virtual address to determine whether a TLB miss exception has occurred;
  computer program code for invoking a miss exception handler;
  computer program code for determining the nature of the TLB miss exception event;
  computer program code for resolving the miss exception event;
  computer program code for returning to initiating an access instruction;
  wherein determining the nature of the TLB miss exception event includes testing the context identifier for the affected virtual address to determine whether the TLB miss exception event results from one of an unassigned context identifier, a translation storage buffer (TSB) resizing operation that affects the virtual address, and an unmapping of a shared translation table entry (TTE) that is associated with the virtual address wherein the TTE comprises a shared memory resource;
  wherein resolving the miss exception events includes resolving each type of miss exception event in accordance with specified miss exception resolution protocol for each type of miss exception event.

13. A computer readable medium as recited in claim 12, wherein resolving the unassigned context identifier miss exception event further includes the steps of:
  assigning a context identifier value to a virtual address space that is to be associated with a process that contains the virtual address;
  assigning selected portion of memory to a TSB that is to be associated with the virtual address space having the assigned context identifier;
  updating at least one of secondary memory assets and the TLB with TSB and context identifier information; and
  returning to initiating an access instruction.

14. A computer readable medium as recited in claim 12, wherein said shared memory resource comprises a translation table entry (TTE).

15. A computer readable medium as recited in claim 12, wherein resolving the miss exception event further includes the steps of:
  determining if the shared memory resource is locked;
    if the shared memory resource is not locked,
      returning to initiating an access instruction; and
    if the shared memory resource is locked,
      pausing the exception handler until the shared memory resource becomes unlocked; and
  returning to initiating an access instruction when the shared memory resource becomes unlocked.

16. A computer readable medium as recited in claim 12, wherein resolving the miss exception event further includes the steps of:
  A) determining if the virtual address space of the TSB undergoing resizing is locked;
    1) in a case wherein the virtual address space of the TSB undergoing resizing is locked, i) pausing the exception handler until the virtual address space of the TSB undergoing resizing becomes unlocked;
ii) locking the virtual address space of the TSB undergoing resizing;
2) in a case wherein the virtual address space of the TSB undergoing resizing is unlocked,
i) locking the virtual address space of the TSB undergoing resizing;
B) once the virtual address space of the TSB undergoing resizing has been locked by one of 1)(ii) and 2(i), determining whether the TSB undergoing resizing has been assigned a specified location in memory;
1) if the TSB undergoing resizing has been assigned a specified location in memory,
i) releasing the lock on the virtual address space of the TSB undergoing resizing; and
ii) returning to initiating an access instruction;
2) if the TSB undergoing resizing has not been assigned a specified location in memory,
i) assigning a specified portion of memory to the TSB undergoing resizing;
ii) releasing the lock on the virtual address space of the TSB undergoing resizing; and
iii) returning to initiating an access instruction.

17. A multi-processor computing system having a plurality of Central processing Unites (CPUs), wherein said multi-processor is operable for handling translation lookside buffer (TLB) miss exceptions in a memory management unit of said multi-processor computer system, and wherein said multi-processor computing system is further operable to:
initiating an access instruction;
determining that a TLB miss exception event has occurred, wherein determining that a TLB miss exception event has occurred includes testing a context identifier for the affected virtual address to determine whether a TLB miss exception has occurred;
invoking a miss exception handler;
determining the nature of the TLB miss exception event;
resolving the miss exception event; and
returning to initiating an access instruction,
wherein determining the nature of the TLB miss exception event includes testing the context identifier for the affected virtual address to determine whether the TLB miss exception event results from one of an unassigned context identifier, a translation storage buffer (TSB) resizing operation that affects the virtual address, and an unmapping of a shared translation table entry (TTE) that is associated with the virtual address wherein the TTE comprises a shared memory resource;
wherein resolving the miss exception events includes resolving each type of miss exception event in accordance with specified miss exception resolution protocol for each type of miss exception event.

18. A multi-processor computing system as recited in claim 17, wherein said testing the context identifier determines that said unavailability results from a miss exception due to an unassigned context identifier, and
wherein resolving the unassigned context identifier miss exception event further includes the steps of:
assigning a context identifier value to a virtual address space that is to be associated with a process that contains the virtual address;
assigning selected portion of memory to a TSB that is to be associated with the virtual address space having the assigned context identifier;
updating at least one of secondary memory assets and the TLB with TSB and context identifier information; and
returning to initiating an access instruction.

19. A multi-processor computing system as recited in claim 17, wherein said testing the context identifier determines that said unavailability results from a miss exception due to a situation wherein the affected virtual address maps to a shared memory resource, and
wherein resolving the miss exception event further includes the steps of:
determining if the shared memory resource is locked;
if the shared memory resource is not locked,
returning to initiating an access instruction; and
if the shared memory resource is locked,
pausing the exception handler until the shared memory resource becomes unlocked; and
returning to initiating an access instruction when the shared memory resource becomes unlocked.

20. A multi-processor computing system as recited in claim 17, wherein testing the context identifier determines that said unavailability results from a miss exception due to a situation wherein the virtual address is associated with a TSB that is undergoing a resizing operation; and
wherein resolving the miss exception event further includes the steps of:
A) determining if the virtual address space of the TSB undergoing resizing is locked;
1) in a case wherein the virtual address space of the TSB undergoing resizing is locked,
i) pausing the exception handler until the virtual address space of the TSB undergoing resizing becomes unlocked;
ii) locking the virtual address space of the TSB undergoing resizing;
2) in a case wherein the virtual address space of the TSB undergoing resizing is unlocked,
i) locking the virtual address space of the TSB undergoing resizing;
B) once the virtual address space of the TSB undergoing resizing has been locked by one of 1)(ii) and 2(i), determining whether the TSB undergoing resizing has been assigned a specified location in memory;
1) if the TSB undergoing resizing has been assigned a specified location in memory,
i) releasing the lock on the virtual address space of the TSB undergoing resizing; and
ii) returning to initiating an access instruction;
2) if the TSB undergoing resizing has not been assigned a specified location in memory,
i) assigning a specified portion of memory to the TSB undergoing resizing;
ii) releasing the lock on the virtual address space of the TSB undergoing resizing; and
iii) returning to initiating an access instruction.

21. A multi-processor computing system of accomplishing memory management of miss exceptions in a memory management unit of a multi-processor computer system, the method comprising;
determining that a miss exception event has occurred, wherein the miss exception event concerns one of: an unassigned context identifier event, a memory access event changing a shared memory resource, and a translation storage buffer (TSB) resizing event;
resolving the miss exception event in accordance with a miss event resolution protocol suitable for resolving the received miss exception event; and wherein said determining determines that the miss exception event comprises an instruction to change a translation table entry (TTE) that is shared by more than one virtual address space wherein each virtual address space has an associated context identifier; and wherein resolving the miss exception event in accordance with a miss event resolution protocol comprises:

identifying virtual address spaces that share the same TTE;

activating a lock for each virtual address space that shares the same TTE to prevent other processes from accessing the TTE while the lock is activated;

changing the corresponding context identifier for each virtual address space that shares the same TTE thereby making the associated TTE unavailable to have memory access instructions performed thereon;

performing the changes on the TTE;

releasing the locks on each locked virtual address space; and freeing the corresponding context identifiers for each affected virtual address space.

* * * * *

UNITED STATES PATENT AND TRADEMARK OFFICE
CERTIFICATE OF CORRECTION

PATENT NO. : 7,188,229 B2
APPLICATION NO. : 10/769586
DATED : March 6, 2007
INVENTOR(S) : Lowe It is certified that error appears in the above-identified patent and that said Letters Patent is hereby corrected as shown below:

On Sheet 2 of 11, in FIG. 2.1, in "Box 203", line 3, delete "idenitifier" and insert -- identifier --, therefor as shown in attached.

In column 1, line 11, delete "Eric F. Lowe," and insert -- Eric E. Lowe, --, therefor.

In column 7, line 33, delete "TTE' S." and insert -- TTE's. --, therefor.

In column 19, line 27, in Claim 17, delete "Unites" and insert -- Units --, therefor.

In column 19, line 28, in Claim 17, delete "lookside" and insert -- lookaside --, therefor.

In column 17, line 43-44, in Claim 10, delete "a miss exception event comprises"

Signed and Sealed this

Twelfth Day of June, 2007

JON W. DUDAS
*Director of the United States Patent and Trademark Office*

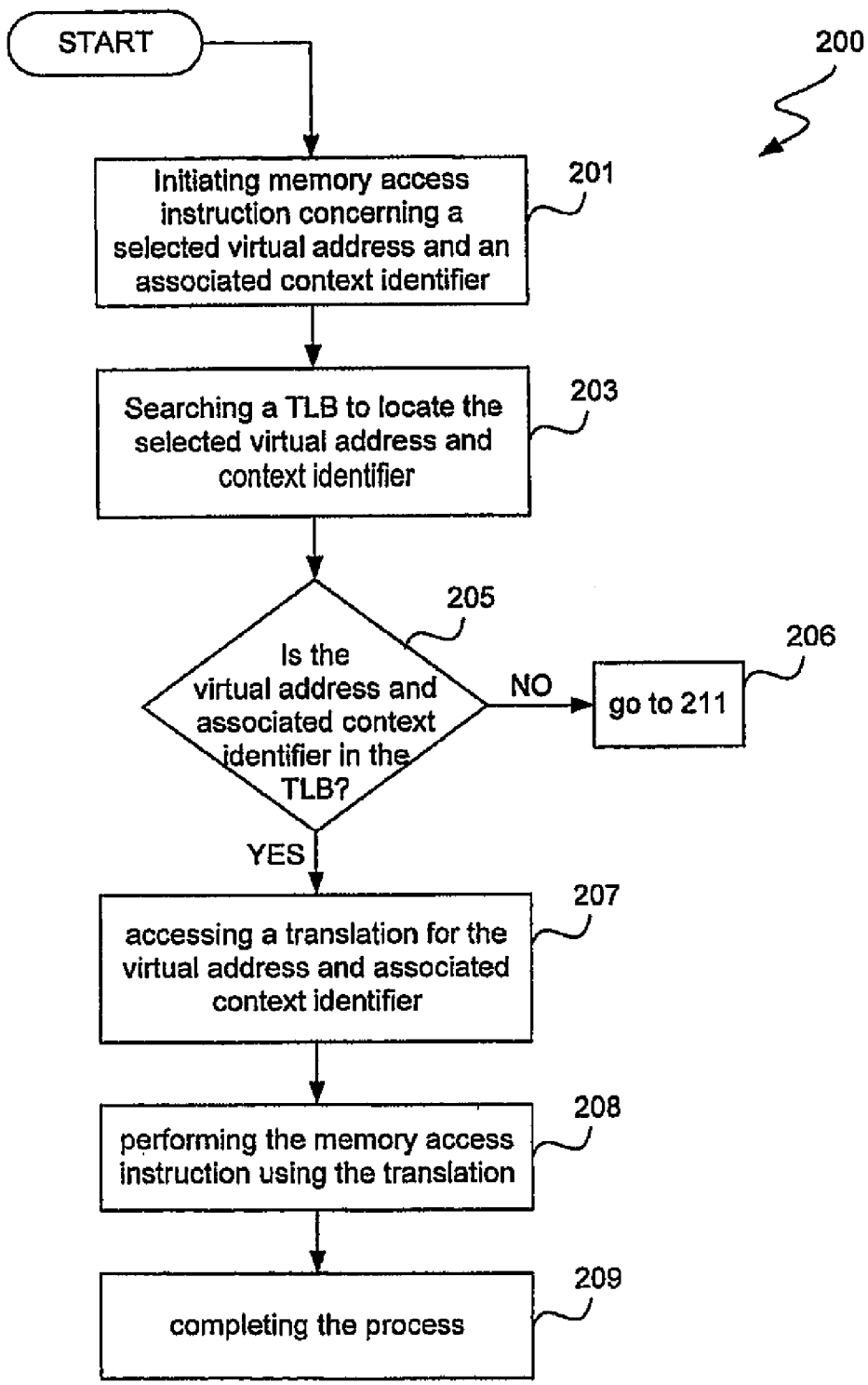
Fig. 2.1